United States Patent [19]

Pope

[11] 4,200,516
[45] Apr. 29, 1980

[54] ELECTROSTATIC COALESCING SYSTEM
[75] Inventor: Kenneth E. Pope, Tulsa, Okla.
[73] Assignee: Combustion Engineering, Inc., Windsor, Conn.
[21] Appl. No.: 929,045
[22] Filed: Jul. 28, 1978
[51] Int. Cl.$^2$ ............................................. C10G 33/02
[52] U.S. Cl. ................................................... 204/302
[58] Field of Search ................................. 204/302-308

[56] References Cited

U.S. PATENT DOCUMENTS

| | | | |
|---|---|---|---|
| 2,963,414 | 12/1960 | Waterman | 204/302 |
| 3,531,393 | 9/1970 | Roberts | 204/302 |
| 3,674,677 | 7/1972 | Roberts | 204/302 |
| 3,679,556 | 7/1972 | Doevenspeck | 204/302 |

FOREIGN PATENT DOCUMENTS 268385  7/1970  U.S.S.R. ................................... 204/302

Primary Examiner—T. M. Tufariello
Attorney, Agent, or Firm—Arthur L. Wade

[57] ABSTRACT

An electrode is fluid-coupled to the driven electrode, which is directly connected to either an AC or a DC source of potential. The driven electrode is provided with the usual ground electrode to establish the electrostatic field of a coalescing system. The electrode fluid-coupled to the driven electrode is positioned to establish two zones in the electrostatic field. A fluid mixture is passed through the two zones of the electrostatic field, in sequence. The intensity of the field in the first zone decreases as the dispersed polar fluid of the mixture increases, in relation to the less polar fluids of the mixture. At the same time, the field in the second zone increases in intensity. The field gradient shifts between the two zones, in accordance with the quantity of the polar fluid in the mixture passed through the zones in the field, in sequence.

7 Claims, 2 Drawing Figures

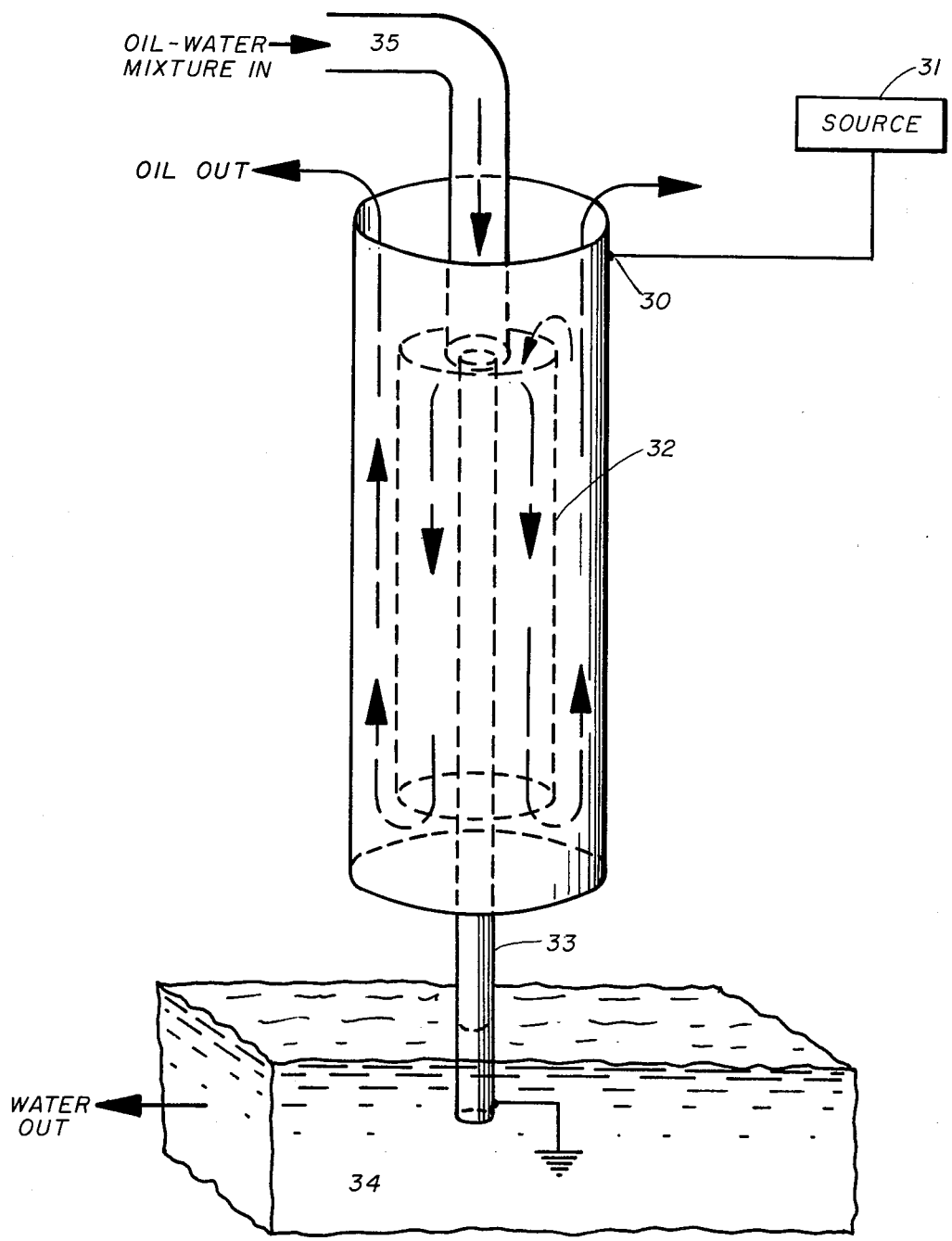

ELECTROSTATIC COALESCING SYSTEM

BACKGROUND OF THE INVENTION

1. Field of the Invention

The present invention relates to establishing two zones in an electrostatic field, which zones will vary in strength of the electrostatic force placed upon the fluid mixture passed through the zones, in sequence, and physically defining the zones, so that the collesced fluid in the first zone will be removed before the remaining mixture passes to the second zone, from which coalesced fluid will be removed. More specifically, the invention relates to utilizing an electrode coupled through the fluid mixture, which mixture is passed through two separate zones of the electrostatic field, the dividing electrode being coupled to the charged electrode through the fluid mixture passed through the zones.

2. Description of the Prior Art

The force of electrostatic fields has been used for many years to coalesce that fluid of a mixture, which is more polar than the other fluids of the mixture, and which is dispersed in drop form through the mixture. The mechanism whereby the force of an electrostatic field brings drops of dispersed polar fluid together, has been debated by those skilled in this art. This issue is beside the point in the disclosure of the present invention. The problem that remains is that of preventing the development of a direct and efficient conductive path between the driven and ground electrodes of an electrostatic system, when the fluid mixture has a certain high percentage of polar fluid dispersed in it. More specifically, how do you preserve some degree of coalescing force, while preventing the development of the shorting path between electrodes, which will over-stress the components of the source of electrical energy?

The second problem is found in establishing zones in the electrostatic field, so that the fluid mixture passing through the zones, in sequence, will be progressively subjected to increasing electrostatic forces to coalesce and remove polar material to a satisfactory low level.

SUMMARY OF THE INVENTION

The present invention contemplates the positioning of a formed conductive body, as an electrode, to physically establish two zones in the field, and to vary the strength of the field in the two zones in dependence upon the quantity of dispersed polar fluid in the mixture passed, sequentially, through the two zones.

The invention further contemplates coupling an electrode, solely by conductive fluid, to the driven electrode of an electrostatic field to physically divide the field into two zones, so the mixture exposed to the field in the first zone will pass downwardly, while the polar mixture coalesced by the electrostatic force is gravitated into separation from the mixture, and the remaining mixture is passed upwardly through the second zone to continue coalescence of what polar material remains dispersed in the mixture, the coalesced drops of fluid gravitating downwardly to also separate from the mixture.

Other objects, advantages and features of the invention will become apparent to one skilled in the art upon consideration of the written specification, appended claims, and accompanying drawings.

BRIEF DESCRIPTION OF THE DRAWINGS

FIG. 2 is a sectioned elevation of an electrode system in which the electrodes are given cylindrical form.

DESCRIPTION OF THE PREFERRED EMBODIMENT

Figure 1:
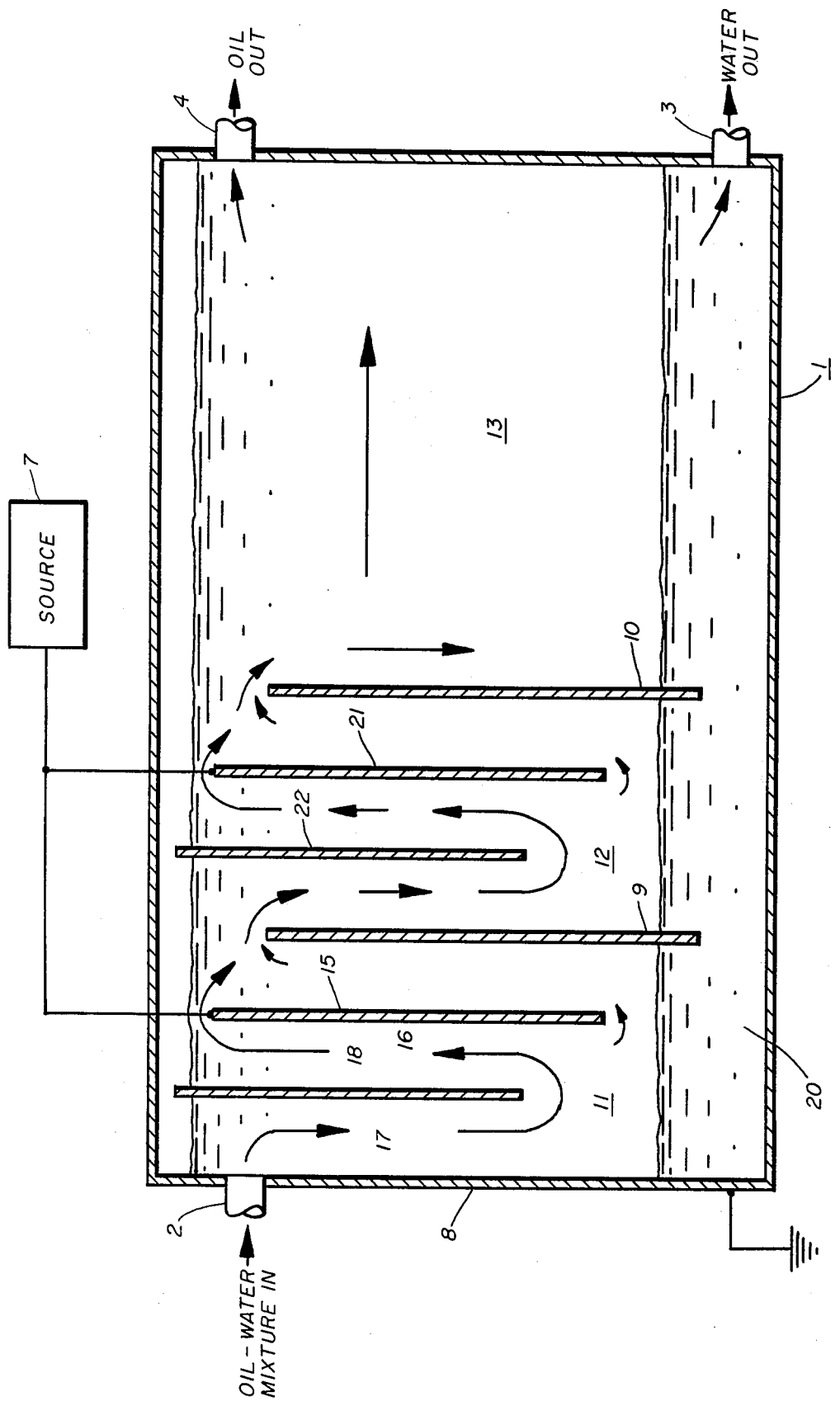
FIG. 1 is a sectioned elevation of an electrode system in a vessel, in which the present invention is embodied.

FIG. 1 embodies the invention in structure within a simple container, or vessel 1. The structure within container 1 processes incoming fluid mixtures, which flow into the vessel through conduit 2. The ultimate object of the invention, of course, is to remove the more polar material component of the mixture through outlet 3, and the remainder of the fluids of the mixture through outlet 4. With a clear understanding that the fluid mixture flowed into vessel 1 could be any of a wide variety of mixtures, the invention will be largely discussed in terms of processing oil well production. Oil well production is basically composed of a mixture of oil, water and gas. Assuming the gas has been removed upstream, vessel 1 receives a mixture of oil and water through conduit 2, as the mixture of fluids to be processed, it follows that this processing results in water being discharged through conduit 3, and the oil being discharged through conduit 4. The electrostatic field established within vessel 1 is between electrodes energized by a connection with a source of potential. For purposes of this disclosure, this source is simply indicated as a "black box" 7. The "black box" 7 can be taken as a DC potential source, or an AC potential source. Whether DC or AC, the source is connected to electrodes to be driven by this power within vessel 1.

Within vessel 1, the electrode system is divided into sections. Note that the sections are physically defined between electrodes, which are at ground potential. More specifically, the left hand side of the vessel is designated 8, and is conductive to function at ground potential. Spaced toward the right, as the drawing is viewed, groud potential electrodes 9 and 10 form with ground electrode 8, sections 11 and 12. Further sections could be established in a similar fashion toward the right of the ground potential electrode 10, but two sections are adequate to disclose the invention. A volume 13 remains as either a settling section for the water and oil to be given residence time, or further electrostatic sections for the fluids in which to utilize the invention.

The Essential Element of the Invention as Dislosed in FIG. 1

In section 11, driven electrode 15 is connected directly to potential source 7 to establish an electrostatic field with the ground electrodes. This field is divided physically into two zones, by a conductive body 16. Body 16 may be given various shapes to carry out its function. In FIG. 1, the body 16 is illustrated as a flat plate, which is conductive, and parallel to its driven electrode 15, which is also in the form of a flat plate. Of course, the side 8 of the vessel 1, which functions as a ground potential electrode, is also a flat plate. Parallel with flat plates 15 and 8, body 16 then becomes, physically, a divider of the electrostatic field into zone 17 and zone 18. Zone 17 receives the mixture of oil and water, which passes downward through zone 17.

The bulk of the coalescence of the water in the mixture is expected to occur in zone 17, and these larger drops are expected to gravitate and join the collection 20 in the lower portion of the vessel. The oil, and any remaining drops of water entrained therein, is expected to then flow upward between electrode 16 and driven electrode 15, flowing through zone 18, passing out of section 11, over the top of the grounded electrode 9, into section 12.

Second Section 12

Second section 12 is expected to function in the same manner as section 11. Driven electrode 21 establishes an electrostatic field with grounded electrode 9, with this field divided by electrode 22. The fluids entering the section 12 from section 11, flow downward between grounded electrode 9 and electrode 22, and upwardly between electrode 22 and driven electrode 21. The water coalesced joins the water below the electrodes for withdrawal through outlet 3, and the oil separated from the water leaves section 12 over the top of grounded electrode 10.

General Flow Pattern and Floating Electrode

To this point, the disclosure has simply indicated the flow path of the fluids, and where the fluids are expected to separate within the electrostatic field, within each section. The force of the electrostatic field to coalesce the more polar fluid within the mixture is generally recognized. But the effects that follow the introduction of electrode 16 in section 11, are an astounding discovery.

Electrode 16 "floats" electrically within its electrostatic field that it physically divides. This electrode is electrically coupled through the conductive mixture of oil and water to the driven electrode 15. The result is a first potential devloped between floating electrode 16 and grounded electrode 8, nd a second potential developed between floating electrode 16 and driven electrode 15, which is dependent upon the conductivity of the fluid mixture through which electrodes are electrically coupled.

The mixture of oil and water flowing downwardly between floating electrode 16 and ground potential electrode 8, has its water drops coalesced. These drops reach the size where they readily continue their gravitation downwardly to body 20. If the water content of the mixture increases in this flow path, a potential between the floating electrode 16, and the ground potential decreases. The results of this decrease in potential is an increase in the potential between floating electrode 16 and driven electrode 15. This variation of potential is in the correct direction of obviate forming the combination of the conductive path between electrode 8 and electrode 16, and a potential which will, in effect, short the source 7 to ground. Therefore, due to this floating connection between electrode 16 and ground, the potential between these two electrodes automatically reduces as the "cut" of the oil-water mixture increases. Implementation of this concept into a practical design is not difficult. The parameters of electrode size, potential source magnitude conductivity of the water-oil mixture, and spacing between the electrodes are fixed under the inventive concept to give practical implementation to the invention. The effectiveness of the electrostatic field in zone 17 can be measured by those skilled in the art. Whether the actual coalescing effectiveness of this portion of the electrostatic field is materially decreased with the lowering of it gradient, would be an interesting investigation, but it is not explored in this disclosure.

Certainly, a significant electrostatic force remains, even as the increased conductivity lowers the gradient. The primary benefit of the lowered gradient is to avoid the destructive effects of forming an effective electrically conductive path between ground potential and the driven electrode, as the "cut" increases. The secondary benefit is that the coalescing force is retained. The precise effectiveness of this force is not calibrated within this disclosure. The interim formulated benefits of the invention are that it is an automatic adjustment of the gradient of the electrostatic field to avoid shorting, while retaining a significant degree of coalescing force.

The electrostatic field of zone 17 results in a significant removal of the water from the mixture. However, few systems are perfect, and it is expected that the fluids flowing around the lower portion of the floating electrode 16 and up through zone 18, will contain small drops of water, which the field gradient in zone 17 failed to coalesce. In zone 18, a second miracle occurs. By the simple balancing of field gradients, the decrease of the field gradient in zone 17 results in an increase in the gradient of the field within zone 18. Therefore, water in the form of drops too small to be coalesced in zone 17, now have the force of the increased gradient of zone 18 placed upon them, and their coalescence continues. The expected coalescence continued in the actual reduction to practice. The water coalesced in this zone, attained the size which caused the drops to gravitate downward against the flow of the mixture upward, joining coalesced water from the first zone 17 in the collection 20.

Again, implementation of this portion of the invention is readily attained by the engineering pick-and-shovel work of sizing and spacing the structure disclosed.

As an example of a sizing and spacing problem, note that driven electrode 15 must be spaced from grounded electrode 9 to avoid the potential gradient between them, shorting the source 7. Of course, the coalescence and removal of the water in zones 17 and 18 are expected to be so effective that the remaining oil, finding itself between driven electrode 15 and grounded electrode 9, will eliminate the danger of shorting, by reason of the conductivity of this fluid. A second floating electrode could be introduced between driven electrode 15 and grounded electrode 9 to obviate shorting. However, the practical reduction to practice could well be built to give adequate spacing between driven electrode 15 and ground electrode 9 to prevent this shorting.

The final formulation of the invention is that it provides an electrostatic field split into two areas, where their gradients fluctuate in accordance with the very content of the polar fluid of the mixture processed. The gradients see-saw in strength between the two zones, in the correct direction to obviate destructive shorting, while maintaining the effective force of coalescence to separate the fluids, in accordance with the objects of the invention.

This process can be repeated in the second section 12, second section 12 has its ground electrode 9, floating electrode 22, and driven electrode 21 to function as their brother and sister electrodes function in preceding section 11. If you don't get all the water in first section 11, you have another shot at it in section 12. If you can't get it all with the two sections, you can add sections until you do get it all. The problem descends to the level of engineering skill, guided by the concepts of the present invention.

There are many details of the function of an electrostatic field, which are temporarily laid aside to get to the inventive concept. There are, undoubtedly, important theories on whether DC or AC potential is more effective within the disclosure of FIG. 1. But the important thing is to agree that an electrostatic field is physically and electrically divided into two zones by a "floating" electrode, which is coupled to the driven electrode through the conductive fluid mixture. This fluid mixture passes sequentially through the two zones, into which the electrostatic field is divided, will be effectively separated with the avoidance of destructive shorting.

FIG. 2—Cylindrical Electrodes

FIG. 1 disclosed the invention embodied with flat plate forms of electrodes. However, FIG. 2 discloses the floating and driven electrodes as telescoping cylindrical forms. There is evidence that the AC driving of the electrode in FIG. 2 is the more effective source of potential.

In FIG. 2, it does not appear that the depiction of A containing vessel is necessary to disclose the invention. The driven electrode 30 is connected to source 31, again depicted as a "black box". Nested within cylindrical electrode 30 is a floating electrode 32 and axially to both electrodes is grounded electrode 33. Below the electrodes is the body of polar fluid (water) 34, into which all the water of the mixture flowed to the electrode system is coalesced and gravitated. A vessel about these components would not be additionally instructive.

The fluid mixture to be processed is flowed through conduit 35. This conduit 35 has an exit centered with grounded electrode 33 to flow the liquids downward. The electrostatic field is expected to coalesce and gravitate downward most of the water in a mixture of oil and water into body 34. The remaining water entrained in relatively small droplets within the oil then flows up the annulus between the driven electrode 30 and the floating electrode 32. Again, the water is coalesced and gravitated to body 34. It is expected that the oil, stripped of its water, will flow from the electrode system from the top of driven electrode 30.

Under the basic concept of the invention, the electrostatic field formed between driven electrode 30 and grounded electrode 33, is divided into two zones by floating electrode 32, the AC gradient applied to developing the electrostatic field is expected to be extremely effective in coalescing water from the oil at the surface of the grounded electrode 33. As in the FIG. 1 system, the conductivity of the fluid mixture in this area between floating electrode 32 and the grounded electrode 33 will adjust, in accordance with the conductivity of this fluid mixture. As the proportion of water increases, the voltage gradient will decrease. Properly engineered under these concepts, the system will obviate shorting of the power source to ground. At the same time, the voltage gradient between driven electrode 30 and floating electrode 32, is expected to increase and be effective in coalescing the small droplets of water which remain entrained as the fluid mixture flows from the first to the second zone.

Those small dispersed droplets of water remaining in the oil, as the mixtures reaches the top of the driven electrode 30, are expected to be aspirated back into the annulus between the grounded electrode 33 and the floating electrode 32. This aspirating arrangement is understood by inspection of the relative positions of the electrodes in FIG. 2.

From the foregoing, it will be seen that this invention is one well adapted to attain all of the ends and objects hereinabove set forth, together with other advantages which are obvious and inherent to the apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

The invention, having been described, what is claimed is:

1. An electrostatic coalescing system for a polar fluid dispersed as drops in a mixture, including less polar fluids, including,
    a vessel adapted to receive a mixture of fluids in which the more polar of the fluids is dispersed in the form of drops,
    an electrode mounted within the fluid mixture passed through the vessel and adapted to be connected to a source of potential,
    a second electrode mounted in the mixture of the fluids and spaced from the driven electrode to establish an electrostatic field between the electrodes,
    a source of potential connected to the driven electrode to generate the electrostatic field between the electrodes,
    an electrically conductive body, placed between the driven electrode and second electrode and shaped to establish two zones in the electrostatic field, through which the fluid mixture received by the vessel flows, in sequence, through the zones, and
    a means for directing polar fluid coalesced in the two zones into a collection below the electrostatic field for common withdrawal from the vessel, whereby the electrostatic field in the first zone decreases in strength as the content of polar fluid of the incoming mixture increases, resulting in an increase in strength of the electrostatic field in the second area.

2. The system of claim 1, in which the source of potential is DC potential.

3. The system of claim 1, wherein the source of potential is AC potential.

4. The system of claim 1, wherein the fluid mixture flows downward in the first zone, and upward in the second zone, while the coalesced drops of polar fluid are gravitated from each, in separation.

5. The system of claim 1, wherein the driven (and fluid coupled) electrode and the electrically conductive body are in the form of concentric cylinders.

6. The system of claim 5, in which the source of potential is DC potential.

7. The system of claim 5, in which the source of potential is AC potential.

* * * * *